United States Patent [19]

Harris

[11] 4,436,868

[45] Mar. 13, 1984

[54] INSULATION COMPOSITION

[75] Inventor: Kendall R. Harris, Houston, Tex.

[73] Assignee: B & B Insulation, Inc., Houston, Tex.

[21] Appl. No.: 453,783

[22] Filed: Dec. 27, 1982

[51] Int. Cl.$^3$ ............................ C08K 3/22; C08K 3/08
[52] U.S. Cl. ...................................... 524/783; 524/858
[58] Field of Search ............... 524/783, 439, 858, 859; 106/287.14, 287.16

[56] References Cited

U.S. PATENT DOCUMENTS

| | | | |
|---|---|---|---|
| 2,410,737 | 11/1946 | Jenny | 524/858 |
| 4,237,667 | 12/1980 | Pallucci | 52/221 |

*Primary Examiner*—Lewis T. Jacobs
*Attorney, Agent, or Firm*—Hubbard, Thurman, Turner & Tucker

[57] ABSTRACT

A composition useful, inter alia, as an insulation material for sealing breaches in architectural barriers, is based on silicone gel which is mixed with powdered lead and lead oxide to achieve desired densities. Silica or silicon dioxide may be utilized to thicken the gel and to maintain the lead and lead oxide in suspension within the gel during curing. The lead acts to increase the density of the gel to enhance the radiation attenuation characteristics of the composition and the lead oxide deters the hardening of the gel in response to radiation.

4 Claims, No Drawings

INSULATION COMPOSITION

BACKGROUND OF THE INVENTION

The present invention relates in general to insulation compositions and in particular to insulation compositions suitable for utilization in sealing breaches in architectural barriers.

It is known to seal breaches in architectural barriers with insulation materials to prevent the spreading of fire or flooding conditions throughout a structure. Typically, fiberglass, rock wool or other well known insulating materials are utilized for these purposes; however, these materials are not suitable for insulation in radioactive areas since they lack sufficient radiation attenuation characteristics to effectively block radiation leakage from a structure.

The necessity of providing an insulation material which will attenuate radiation has led to the development of flexible gel-like materials which may be altered to enhance their density and thus their radiation attenuation characteristics. To this end, it is known to provide a jelly-like substance, such as silicone gel, and to suspend powdered lead within the gel to greatly increase the density thereof. Silica sand or other materials are typically utilized to maintain the lead in suspension until such time as the gel has sufficiently cured. The altered gel is then utilized to insulate breaches in architectural barriers through which piping, wiring and other objects may pass.

The known composition comprised of silicone gel and powdered lead is reasonably suitable for most applications; however, in those situations in which a metal pipe passes through the architectural breach, it is necessary to maintain the gel in a flexible state to accommodate the expansion and contraction of the pipe in response to variations in temperature conditions. Known silicone gel/lead compositions demonstrate a tendency to cure excessively when exposed to gamma radiation, due to cross linking of the polymers present in the silicone gel. This excessive hardness will prevent the gel composition from accommodating the expansion or contraction of pipes and may result in a condition which will permit fire, flooding or gamma radiation to leak through the structure.

SUMMARY OF THE INVENTION

Accordingly, it is one object of the present invention to provide an improved insulation composition.

It is another object of the present invention to provide an improved insulation composition of suffucient density to attenuate gamma radiation.

It is yet another object of the present invention to provide an improved high density insulation composition which will remain flexible during exposure to gamma radiation.

The foregoing objects are achieved as is now described. The insulation composition is based on silicone gel which is mixed with powdered lead and lead oxide to achieve desired densities. Silica or silicon dioxide may be utilized to thicken the gel and to maintain the lead and lead oxide in suspension within the gel during curing. The lead acts to increase the density of the gel to enhance the radiation attenuation characteristics of the composition and the lead oxide deters the hardening of the gel in response to radiation.

DETAILED DESCRIPTION OF THE INVENTION

The insulation composition of the present invention is based primarily upon a liquid gel which may consist of a jelly-like substance which is formed by the coagulation of a colloidal solution into a solid phase, such as silicate gel or silicone gel. A suitable gel material is manufactured by the Dow Corning Corporation of Midland, Mich. This material, Dow Corning 3-6527 Silicone Dielectric Gel, is distributed in two component liquid silicone form. When the two components are thoroughly mixed in equal parts, by weight or volume, the gel will cure to form a resilient gel-like mass which exhibits physical stability over a wide range of temperatures.

The gel is preferably altered to provide a high degree of density by the addition of powdered lead, as is known in the art. Lead oxide is then added to the gel to prevent the gel from excessive curing when exposed to gamma radiation. Silica or silicone dioxide may be utilized to maintain the lead and lead oxide in suspension within the gel while the gel cures. The preferred range of the constituents of the composition are as follows:

| Constituent | Percent by Weight |
| --- | --- |
| Silicone gel | 25–40% |
| Powdered lead | 30–60% |
| Lead oxide | 5–35% |
| Silicone dioxide | 0–2% |

To prepare the composition of the present invention, it has been found preferable to mix equal parts of lead, lead oxide and silicon dioxide into each of the two components of the silicone gel. The two altered components of silicone gel may then be combined in equal parts to begin the curing of the gel material.

Silicone dioxide is preferably added first to each of the two silicone gel components to thicken the gel components and enhance the amount of lead and lead oxide which will remain in suspension until the gel cures. In alternate embodiments, silica sand may be utilized for this purpose.

After the silicon dioxide has been added to each component of the silicone gel, lead and litharge (lead monoxide) are blended into each component of the silicone gel in the percentages cited herein. The two silicone gel components are then added together to initiate curing and may be dispensed into architectural breaches with suitable pressure applicators.

Two examples of specific compositions embodying the present invention will now be described.

EXAMPLE 1

The following constituents in the following percentages are mixed with the two components of the silicone gel (referred to as component A and component B). Silicon dioxide is added first to enhance the suspension capability of the gel. The remaining constituents are then added and the resultant components are mixed together prior to application to begin curing the gel.

| Constituent | Percent by Weight |
| --- | --- |
| Silicone gel "A" | 16.59% |
| Silicone dioxide | .63% |
| Powdered lead | 16.39% |

| Constituent | Percent by Weight |
| --- | --- |
| Lead oxide | 16.39% |
| | 50% |
| Silicone gel "B" | 16.59% |
| Silicon dioxide | .63% |
| Powdered lead | 16.39% |
| Lead oxide | 16.39% |
| | 50% |

EXAMPLE 2

This is prepared exactly as Example 1, with the composition varied as follows:

| Constituent | Percent by weight |
| --- | --- |
| Silicone gel "A" | 16.59% |
| Silicone dioxide | .63% |
| Powdered lead | 29.48% |
| Lead oxide | 3.30% |
| | 50% |
| Silicone gel "B" | 16.59% |
| Silicone dioxide | .63% |
| Powdered lead | 29.48% |
| Lead oxide | 3.30% |
| | 50% |

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:
1. A composition comprising:
   25–40% by weight silicone gel;
   30–60% by weight powdered lead; and
   5–35% by weight lead oxide.
2. A composition comprising:
   25–40% by weight silicone gel;
   30–60% by weight powdered lead;
   5–35% by weight lead oxide; and
   0.5–1.5% by weight silicon dioxide.
3. A composition comprising:
   about 33% by weight silicone gel;
   about 33% by weight powdered lead;
   about 33% by weight lead oxide; and
   about 1% by weight silicon dioxide.
4. A composition comprising:
   about 33% by weight silicone gel;
   about 59% by weight powdered lead;
   about 7% by weight lead oxide; and
   about 1% by weight silicon dioxide.

* * * * *